April 4, 1944.    F. R. BURCH    2,345,727
FISHING TOOL
Filed Oct. 4, 1943

Frederick R. Burch
INVENTOR.
BY

Patented Apr. 4, 1944

2,345,727

UNITED STATES PATENT OFFICE 2,345,727

FISHING TOOL

Frederick R. Burch, Seattle, Wash.

Application October 4, 1943, Serial No. 504,833

2 Claims. (Cl. 294—86)

In boring wells with a rope drill the rope or cable is constantly moving up or down, and, coming in contact with the casing of the well, causes a friction which deteriorates the cable and so weakens the same that it eventually breaks and falls down into the well in coils.

In order to recover the cable and drill, means for grappling the cable must be used. This endeavor to seize the cable is known as fishing, and the tools used are known as fishing tools.

In the present state of the art the fishing tool used is known as a spear and consists of a shaft, sharpened at one end, and a number of prongs spaced for the full length thereof and rigidly fastened thereto. This spear is driven downward into the coils of the cable by means of a conventional construction accepted and used in the art of boring wells and known as a jar.

There being no way of compacting the coils of the cable against the prongs of the spear except by pressure against the casing of the well, this pressure creates intense friction which, in turn, causes the cable to jam against said casing and which becomes more and more intense as the spear moves upwardly, and eventually it becomes locked and defeats the entire process, with the usual result that all the cable, spear and drill are a complete loss and the well, at times, must be abandoned, or if recovered, it is at great expense.

With the foregoing in view, my invention relates to improvements in fishing tools for grappling rope or cable which for any cause has fallen down into the well.

The important object of my invention is to provide a fishing tool that will firmly seize the rope or cable lying coiled in the well and rigidly retain its grip and at the same time prevent any friction and consequent jamming of the compacted coils of the cable against the casing of the well on its upward movement.

Other objects and advantages of the invention will be apparent during the course of the following description.

In the accompanying drawing, forming a part of this specification, and in which like numerals are employed to designate like parts throughout the same:

Figures 1, 2, 3:
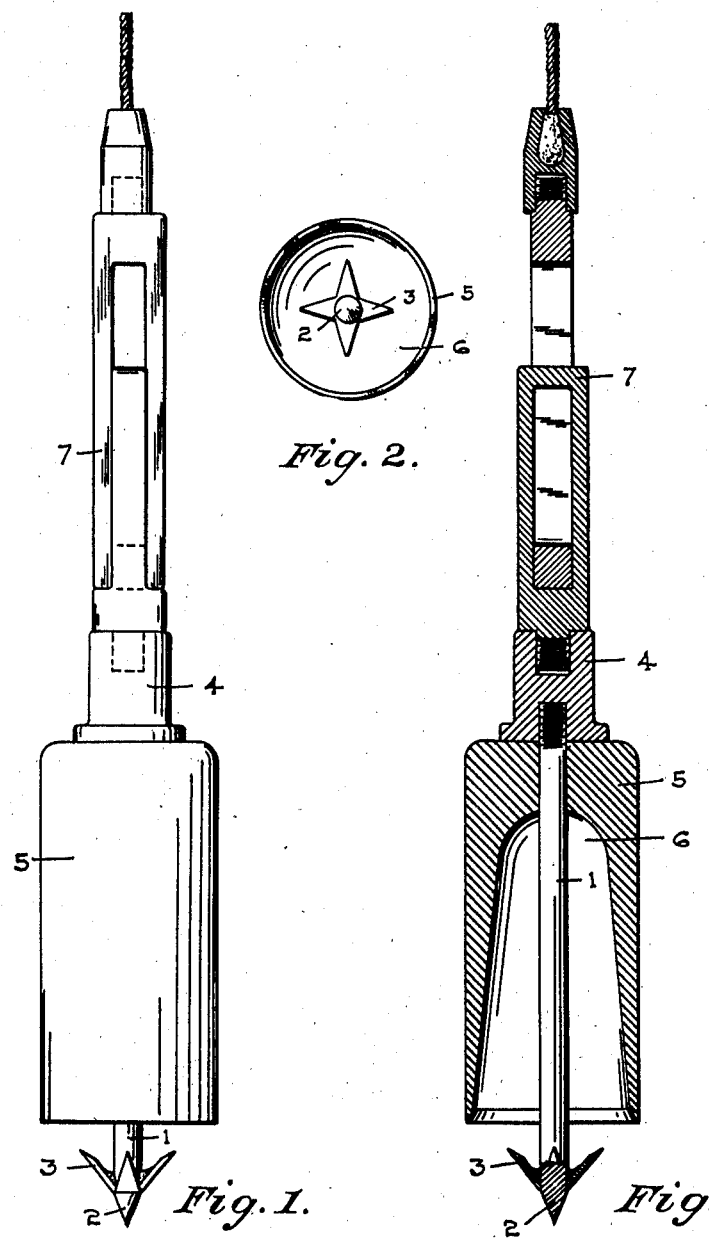
Figure 1 is a side elevation of a fishing tool embodying my invention, and illustrating the method of attaching the jar and cable thereto.
Figure 2 is a bottom view of my invention.
Figure 3 is a central vertical longitudinal section through the same.

In the drawing, wherein for the purpose of illustration, is shown a preferred embodiment of my invention, the numeral 1 designates a solid shaft portion, which is preferably circular in cross section. This solid shaft portion comprises the pointed lower end 2 for piercing the coiled rope or cable, a set of prongs 3 rigidly attached to the solid shaft in close proximity to the pointed end 2 thereof, said prongs angling upward at approximately 45 degrees, and a socket 4 removably mounted on the upper end of the solid shaft 1 for the purpose of connecting with the conventional jar 7 used in the art and also to prevent the compacting chamber 5 from rising too high above the prongs 3 on the shaft 1.

The numeral 5 designates the compacting chamber, being a shell, cylindrical in outer form for the purpose of holding the tool upright in the well, and an open interior preferably cone-shaped in form 6, like an inverted cup, for the purpose of compacting the coils of rope or cable around the shaft member 1 above the prongs 3 thereof, and at the same time preventing said compacted coils from coming in contact with the casing of the well.

The compacting chamber 5 is slidably mounted on the solid shaft 1 between the prongs 3 and the socket 4 and is held down in proper relation to the prongs 3 by the base of the socket 4.

The operation of the fishing tool is as follows:

The fishing tool is assembled as shown in Figure 1 and attached to a jar and cable as now used in the art as illustrated in said Figures 1 and 2. It is then lowered into the well till it contacts the lost cable and is then jarred downward. The pointed end 2 of the solid shaft portion 1 penetrates the coiled rope or cable and leads the prongs thereon 3 downwardly into the said coils. The compacting chamber 5 by the same action is driven downwardly between the said coils and the casing of the well and, owing to the interior form of said element 6, said coils are contracted and thus compacted against the solid shaft 1 above the prongs 3 thereby giving the prongs a rigid grip when subjected to an upward pull and also prevents the said compacted coils from coming in contact with the casing of the well and the consequential jamming.

The compacting chamber 5 is held down in proper relation to the prongs 3 by the socket 4. This permits the prongs 3 to have full space while penetrating the said coils and a contracted space on their upward movement, thereby giving the prongs 3 a firm and rigid grip on the cable.

It is to be understood that the form of my invention, herewith shown and described, is to be taken as a preferred example of the same, and that various changes in the shape, size and arrangement of parts may be resorted to without departing from the spirit of my invention, or the scope of the subjoined claims.

Having thus described my invention, I claim:

1. A device of the character described, comprising in combination, a solid shaft portion having one end pointed, a set of prongs rigidly attached thereto in close proximity to the pointed end thereof and angling upward approximately 45 degrees to the main shaft, and a socket removably mounted on the other end of said shaft; a compacted chamber consisting of a shell, cylindrical in outer form and conical in inner form, said chamber being slidably mounted on said shaft member between said prongs and socket substantially as shown and described.

2. A device of the character described, comprising in combination, a solid shaft portion having one end pointed, a set of prongs rigidly attached thereto in close proximity to the pointed end thereof and angling upward approximately 45 degrees to the main shaft, and a socket removably mounted on the other end of said shaft; a compacting chamber consisting of a shell and comprising an inner cavity, and means for holding said chamber upright in the well; said chamber being slidably mounted on said shaft member between said prongs and socket and means for jarring said fishing tool either up or down substantially as shown and described.

FREDERICK R. BURCH.